United States Patent [19]

Bartlit et al.

[11] 4,353,871
[45] Oct. 12, 1982

[54] HYDROGEN ISOTOPE SEPARATION

[75] Inventors: John R. Bartlit, Los Alamos, N. Mex.; William H. Denton, Abingdon, Great Britain; Robert H. Sherman, Los Alamos, N. Mex.

[73] Assignee: The United States of America as represented by the United States Department of Energy, Washington, D.C.

[21] Appl. No.: 37,603

[22] Filed: May 10, 1979
(Under 37 CFR 1.47)

[51] Int. Cl.³ ............................ B01D 3/00; F25J 3/02
[52] U.S. Cl. .................................. 422/159; 422/190; 203/5; 62/24
[58] Field of Search ............... 423/249, 648 A; 62/28, 62/29, 24, 23; 422/159, 190; 203/5

[56] References Cited

U.S. PATENT DOCUMENTS 3,126,267  3/1964  Vander Arend ...................... 62/27

FOREIGN PATENT DOCUMENTS 246445  5/1963  Australia ........................ 423/648 A Primary Examiner—Frank W. Lutter
Assistant Examiner—Chris Konkol
Attorney, Agent, or Firm—Jerome B. Rockwood; Paul D. Gaetjens; James E. Denny

[57] ABSTRACT

A system of four cryogenic fractional distillation columns interlinked with two equilibrators for separating a DT and hydrogen feed stream into four product streams, consisting of a stream of high purity $D_2$, DT, $T_2$, and a tritium-free stream of HD for waste disposal.

1 Claim, 2 Drawing Figures

HYDROGEN ISOTOPE SEPARATION

BACKGROUND OF THE INVENTION

Experimentation with nuclear fusion reactions has created a need for handling the deuterium tritium fuel employed. The starting material employed is a mixture of hydrogen isotopes, consisting nominally of equimolar quantities of deuterium and tritium with low levels of hydrogen. In the present invention four product streams are provided. These are (1) an essentially tritium free stream of $H_2$ and HD wastes for disposal to the atmosphere, (2) a high purity stream of $D_2$, a stream needed in fusion research for refueling and plasma heating by injection, (3) a stream of basically pure DT for refueling fusion reactors, and (4) a high purity stream of $T_2$ for refueling and for studies on properties of tritium and effects of tritium on materials. All of the above separations must be performed continuously and reliably over long periods of time.

Cryogenic fractional distillation was selected as the best process for making the required separations due to relatively large separation factors, low power consumption, high throughputs, relatively short start-up times, and flexibility of design.

A system of four distillation columns is required to produce four products of specified purity from a multicomponent mixture. In addition, comparison of the feed stream with the four desired product streams indicates that one component, HT, is in the feed stream and is not desired in any product stream. It is desired, therefore, to discard the H, tritium-free, to the atmosphere and retain the T in the system. Thus, HT molecules must be split, which cannot be done by distillation alone. Destruction of HT molecules is accomplished by two catalytic room temperature equilibrators, which destroy HT in the presence of large quantities of $D_2$ by promoting the reversible reactions: $HT + D_2 \rightleftharpoons HD + DT$. Thus the total separation scheme consists of six elements, four cryogenic distillation columns plus two equilibrators.

An important factor involved in the present invention are the characteristics of tritium. Tritium is radioactive, 9270 Ci/g, has a resultant radioactive rate of decay of 0.324 W/g, and is extremely expensive, presently costing approximately $3,000 per gram. As a result of these characteristics, it is highly desirable that the amount of tritium in the system be kept to a minimum.

Two additional important design parameters are the relative volatilities for $D_2/DT/T_2$ and the separating efficiency of commercial distillation column packings.

DESCRIPTION OF THE PREFERRED EMBODIMENT

Figure 1:
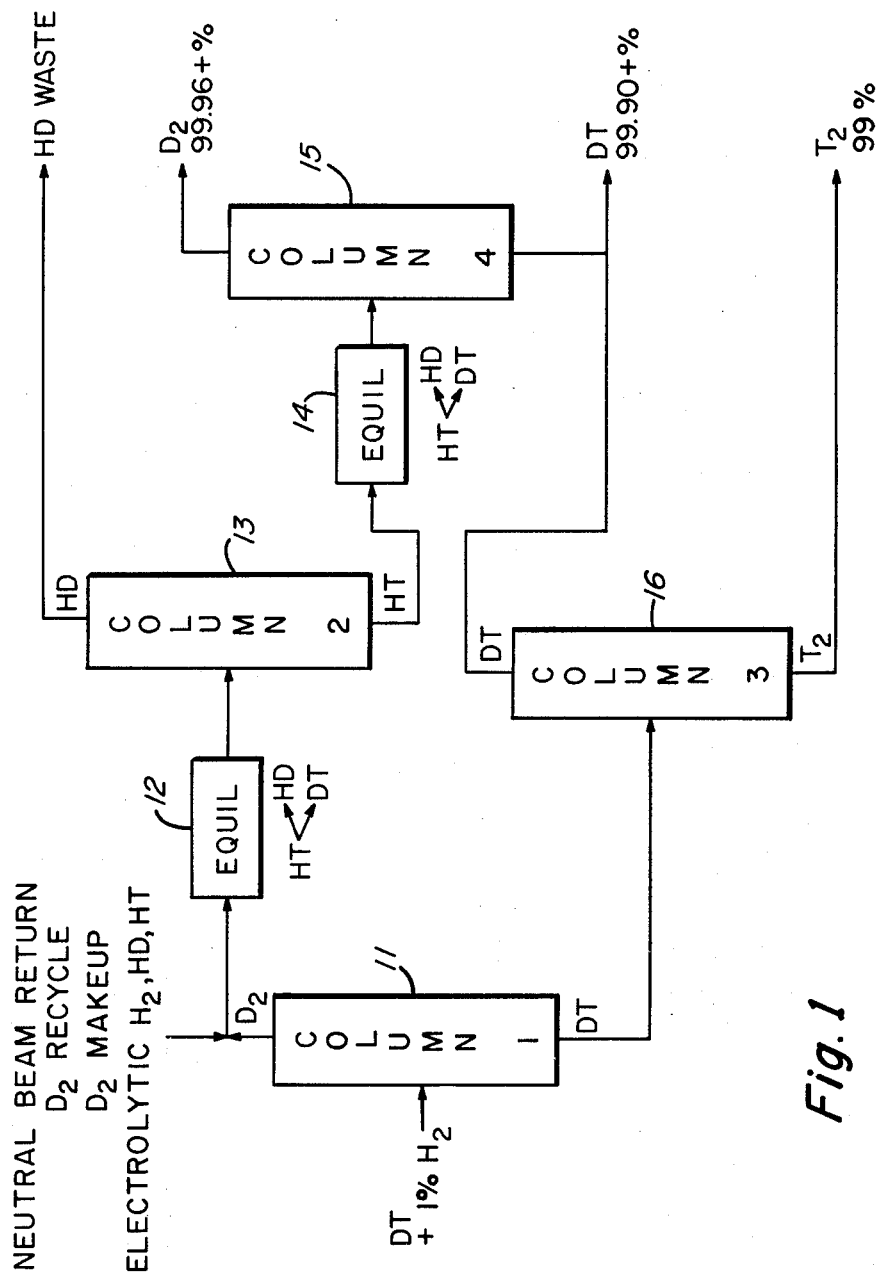
FIG. 1 is a flow diagram of the hydrogen isotope distillation system of the present invention.

Referring now to FIG. 1, a flow diagram of the present invention illustrates a first distillation column 11 and a first equilibrator 12. Column 11 receives the DT input with a small amount, approximately 1% of $H_2$. Products of column 11 are 0.9500 $D_2$ and 0.0025 DT. Equilibrator 12 receives HT and the $D_2$ from column 11, splitting the HT and producing HD and DT. A second distillation column 13 receives the product of equilibrator 12. The products of second distillation column 13 include non-radioactive hydrogen-deuterium waste which may be expelled to the environment or used in other processes. The useful product of distillation column 13, HT, is fed to equalibrator 14, splitting the HT into HD and DT. These are fed to distillation column 15. The third distillation column 16 receives the product of the first column 11, producing tritium and deuterium-tritium. The proportion of products of column 13 are 0.9900 HD and 0.00005 HT, while the products of column 16 are 0.995 DT and 0.1 $T_2$. Fourth distillation column 15 produces 0.9875 $D_2$ and 0.0050 DT. The useful product streams from the system are 99.96% pure $D_2$, 99.9% pure DT, and 99% pure $T_2$.

Figure 2:
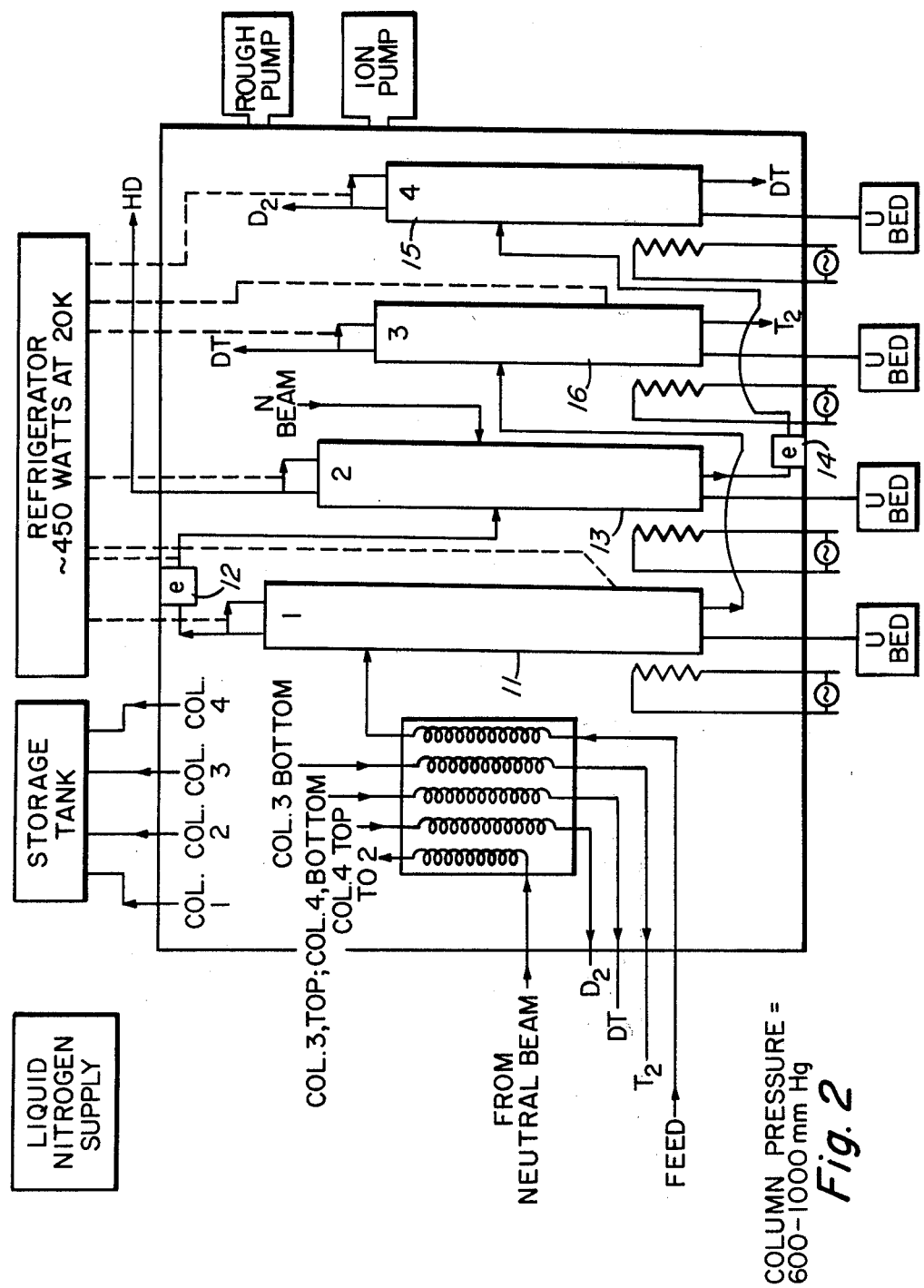
FIG. 2 is a schematic diagram of the present invention.

A schematic representation of the present invention is illustrated in FIG. 2. The system of the four distillation columns is in general required to produce four products of specified purity from a multicomponent mixture. In addition, comparison of the feed stream with the four desired product streams reveals one component, HT, in the feed stream which is not desired in any product stream. It is desired to discard the H tritium-free to the environment and retain the T in the system. Thus, HT molecules must be split. Destruction of HT molecules is accomplished by the two catalytic, room temperature equilibrators 12 and 14 which destroy HT in the presence of large quantities of $D_2$ by employing the reversible reaction $HT + D_2 \rightleftharpoons HD + DT$. Thus, the total separation scheme consists of six elements, the four cryogenic distillation columns 11, 13, 15 and 16 plus the two room temperature equilibrators 12 and 14. As discussed hereinabove, it is desired to keep the amount of tritium in the system to a minimum. The tritium inventory is mainly in columns 11 and 13 and, therefore, depends upon the size of these columns.

A key element in reducing the size of column 11 is the $D_2$ recycle stream. This stream provides the excess quantities of $D_2$ needed to drive the equilibrators without necessitating an increase in the size of column 11 to produce the excess from the primary feed stream.

Because only limited data have been available for tritium systems, laboratory measurements are made to determine two of the key design parameters on which the least information was available, the relative volatilities for $D_2$, DT, and $T_2$, and the separating efficiency of commercial distillation packings. Values of the relative volatility were measured for $D_2$, DT, and for $T_2$, and were found to lie about 5% below the ideal values computed as a ratio of vapor pressures of the pure components.

The separating efficiency of the distillation was measured in the laboratory employing two different types of commercial packing. The results indicated values of height equivalent to a theoretical plate of 50±5 mm. The value of 50 mm was used in the process design calculations. Also for design calculations, an allowable vapor velocity of 89 mm per second was used, which was consistent with the laboratory results and results from other sources.

By means of computation and the experimental data, the four column distillation process of the present invention was designed in accordance with the following table.

TABLE I

| | col. packed ht., m | col. inside diam., mm | Refrig. @ 20 K, W | tritium inventory, g |
|---|---|---|---|---|
| Col. 11 | 4.11 | 29.0 | 38.6 | 34.3 |

TABLE I-continued

| | col. packed ht., m | col. inside diam., mm | Refrig. @ 20 K, W | tritium inventory, g |
|---|---|---|---|---|
| Col. 13 | 4.06 | 19.0 | 18.2 | 0.1 |
| Col. 16 | 3.20 | 23.2 | 24.1 | 57.5 |
| Col. 15 | 4.11 | 38.0 | 64.6 | 10.3 |
| Over-all Total | 5.5[a] | 711.[a] | 145.5[b] | 102.2[c] |

[a] outer vacuum shell
[b] excluding heat leak
[c] including reboilers

In column operation the liquid flows in the stripping section of columns 11 and 16 almost cease, due to evaporation as a result of the heat decay of tritium. This can be compensated for by increased reflux and flow in the rectifying section, but at the expense of greatly increasing the amount of tritium in the system. Preferably, additional cooling is provided to remove the radioactive heat of decay stage by stage for each column. Also added were alternate feed taps for the columns to provide increased flexibility of operation and fluid sampling in the column. The four columns, together with the necessary instrumentation, interconnecting and refrigeration piping, and a thermal shield at 77K, are enclosed in a single stainless steel vacuum shell which also serves as secondary containment for the processed radioactive tritium. This unit plus a cryogenic refrigerator and pumps complete the system.

Herein has been disclosed a system of four interlinked cryogenic fractional distillation columns capable of separating the feed stream of mixed isotopes of hydrogen including deuterium, tritium, and DT high purity product streams.

What is claimed is:

1. An apparatus for hydrogen isotope distillation separating a feed stream of about 50% deuterium and about 50% tritium, the streams also containing on the order of 1% hydrogen, into four product streams, a tritium-free stream of HD for waste disposal, a stream of high-purity $D_2$, a stream of DT, and a stream of high purity tritium, said apparatus comprising:

(a) a first column;
(b) a first equilibrator;
(c) said first column having a top and a bottom and an input into which said feed stream is directed for depletion of the top stream in DT and $T_2$ and for subsequent splitting of the HT molecule in said first equilibrator in the presence of excess $D_2$ and depleted HT into HD and DT according to the reversible reaction $HT + D_2 \rightleftharpoons HD + DT$;
(d) a second column;
(e) means for drawing a $D_2$ rich top stream from said top of said first column through said first equilibrator and into said second column having a top and a bottom;
(f) means for drawing from the top of said second column said tritium free stream of HD for waste disposal;
(g) a third column having a top and a bottom;
(h) means for drawing DT from the bottom of said first column and inputting it into said third column;
(i) means for drawing said stream of high purity tritium from the bottom of said third column;
(j) means for drawing DT from the top of said third column and insertng it into said product stream of DT;
(k) a second equilibrator;
(l) a fourth column;
(m) means for drawing a $D_2$ stream from the bottom of said second column, passing it through said second equilibrator to drive the reaction $HT + D_2 \rightleftharpoons HD + DT$ to the right side of the equation and inputting it into said fourth column having a top and a bottom;
(n) means for drawing DT from the bottom of said fourth column and inserting it into said product stream of DT;
(o) means for drawing said stream of high-purity $D_2$ product from the top of said fourth column; and
(p) means for recycling part of said high-purity $D_2$ product stream into said stream from the top of said first column immediately before said first equilibrator to drive the reaction to the right side of the equation $HT + D_2 \rightleftharpoons HD + DT$.

* * * * *